April 21, 1925.

T. A. NEVINS 1,535,031

ASSEMBLING AND COUNTING MECHANISM

Filed May 18, 1923 6 Sheets-Sheet 4

WITNESSES

INVENTOR
THOMAS A. NEVINS
BY
ATTORNEYS

April 21, 1925.

T. A. NEVINS 1,535,031

ASSEMBLING AND COUNTING MECHANISM

Filed May 18, 1923

WITNESSES

INVENTOR
THOMAS A. NEVINS

ATTORNEYS

Patented Apr. 21, 1925.

1,535,031

UNITED STATES PATENT OFFICE.

THOMAS A. NEVINS, OF NEW YORK, N. Y., ASSIGNOR, BY MESNE ASSIGNMENTS, TO HERCULES MATCH CORPORATION, OF NEW YORK, N. Y., A CORPORATION OF NEW YORK.

ASSEMBLING AND COUNTING MECHANISM.

Application filed May 18, 1923. Serial No. 639,956.

*To all whom it may concern:*

Be it known that I, THOMAS A. NEVINS, a citizen of the United States, and a resident of the city of New York, borough of Manhattan, in the county and State of New York, have invented a new and Improved Assembling and Counting Mechanism, of which the following is a full, clear, and exact description.

The present invention relates to new and useful improvements in assembling and counting machines, and while the principles of the mechanism described herein may be employed in various connections, it is particularly adapted for assembling and counting match packages or books.

It is one of the objects of the invention to provide a new and improved mechanism for assembling match packages and match books. As commonly constructed, owing to the heads of the matches being positioned at one end of the book, the match books are thinner at one end than at the other, and when these books are packed in receptacles, it is necessary that the match books be alternated, that is, the thicker end of one book be positioned between the thinner ends of the next adjacent books on opposite sides thereof.

It is a further object of the present invention to provide a new and improved mechanism which serves to automatically reverse the position of alternate books of matches as they are received from the match-making machine.

It is a further object of the invention to provide a new and improved form of mechanism for counting match books in order that a predetermined number of match books may be alternated with respect to each other for the purpose of making a uniform package of match books.

It is a further object of the invention to construct the counting mechanism in such a manner that it will be automatically operated.

It is a further object of the invention to provide a counting mechanism whereby a predetermined number of alternate match books is had, which predetermined number is removed from a carrier forming a part of the counting mechanism to be positioned in the ultimate package.

It is a further object of the invention to provide a new and improved feeding mechanism for the assembling mechanism.

It is a further object of the invention to provide a new and improved feeding mechanism for the counting mechanism.

It is a further object of the invention to provide automatic means whereby certain elements of the mechanism will be maintained inoperative upon failure of the feeding mechanism to deliver a match book to the assembling mechanism.

With the above and other objects in view, reference is had to the accompanying drawings, in which—

Fig. 8ª is a detail sectional view taken on the line 8ª—8ª of Fig. 8;

As heretofore stated the mechanism of the present invention is adapted for use in connection with match-making machines generally and it is particularly adapted for use in connection with a machine such as shown in my pending application filed November 28, 1922, Serial No. 603,865. It is obvious, however, that the mechanism is capable of use in other connections where it is desired to obtain the operation carried out by the machine.

In carrying out the present invention the assembling and stacking mechanisms are preferably mounted directly on the match-making machine, such machine having a power shaft 25 by means of which its several parts are operated. The mechanism of the present invention is likewise driven from this power shaft 25 by means of a gear 26 carried by the power shaft.

The match-making machine is of the type especially adapted for forming what is known in the art as "book matches", and the machine has various mechanisms by means of which the backs of the books are assembled, and the matches placed therein, after which the book backs are folded, and by means of a suitable mechanism are secured in folded position. During the several operations, the match books are carried by a conveyer and this conveyer is designated by the reference character 27 in the present instance.

Figure 1:
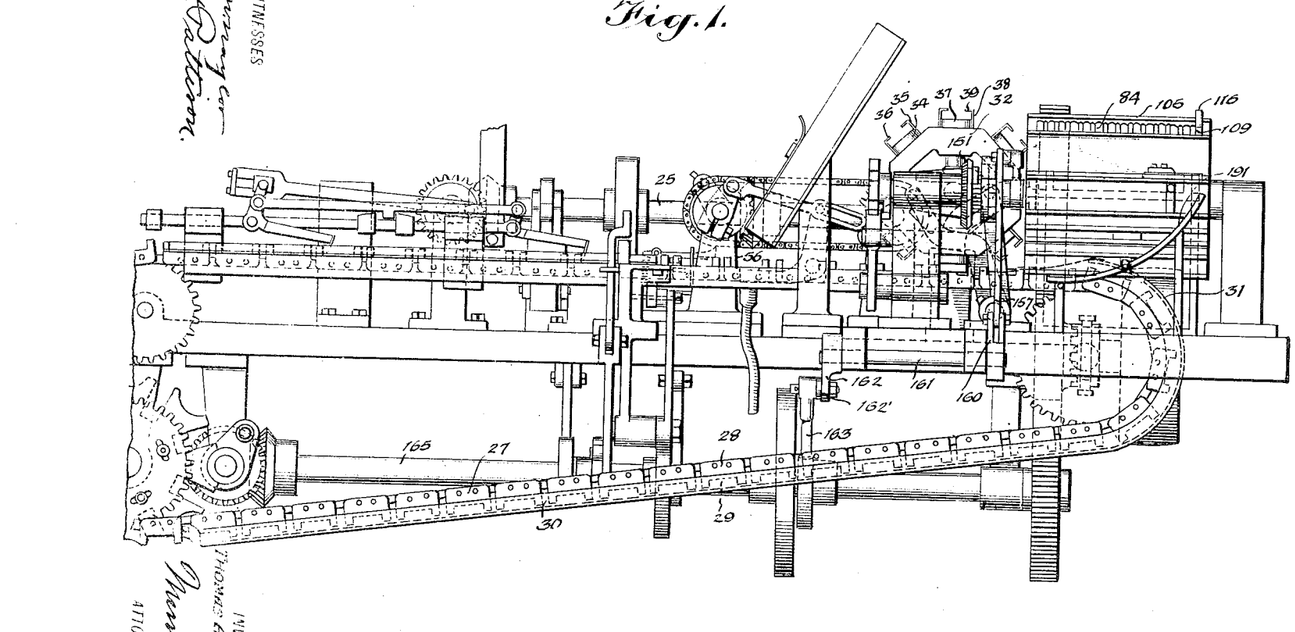
Figure 1 is a view in front elevation of a mechanism constructed in accordance with the present invention, such figure showing the attachment of the mechanism to a match-making machine of the type described and set forth in my co-pending application filed November 28, 1922, bearing Serial No. 603,865.

The conveyer 27 comprises a plurality of link members 28 having recessed portions 29 in which the match books rest after the same have been completed. This conveyer passes around the bottom of the machine and in order to prevent discharge of the match books from their pockets 29 in the links 28, a guard plate 30 is employed, such guard plate being curved upwardly as designated by the reference character 31 in Fig. 1.

The conveyer 27 passes beneath a positioning mechanism 32, which positioning mechanism serves to reverse the alternate match books in order that the thicker end of a match book will be juxtaposed with respect to the thinner end of the match books on opposite sides thereof, thus forming a straight stack which may be readily packed in a box or other suitable package.

Figures 8, 8A, 9:
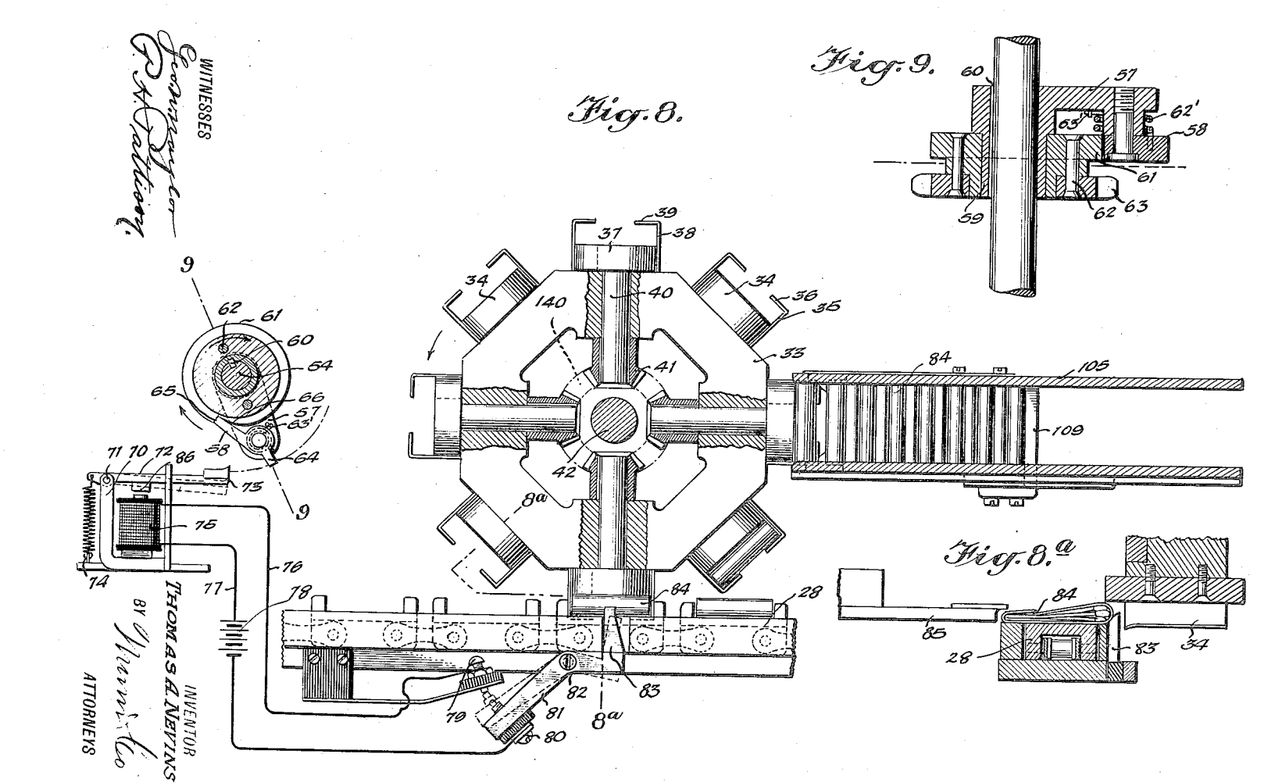
Fig. 8 is a sectional view showing the assembling mechanism as combined with the automatic stopping and controlling mechanism.
Fig. 9 is a sectional view taken on the line 9—9 of Fig. 8.
Figures 10, 15:
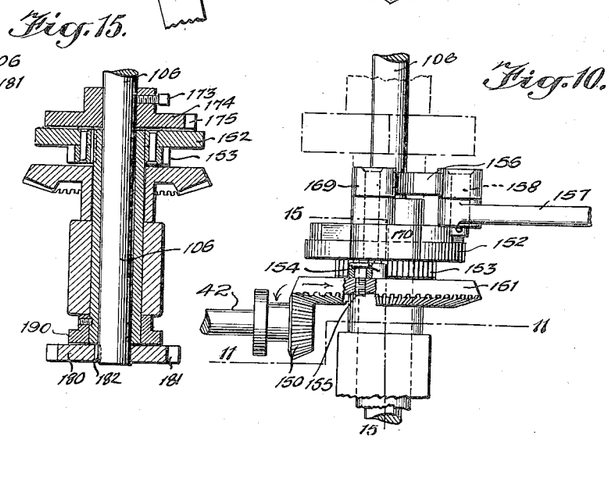
Fig. 10 is a plan view partly in section showing the intermittent feeding mechanism of the stacking mechanism.
Fig. 15 is a detail sectional view taken on the line 15—15 of Fig. 10.
Figure 11:
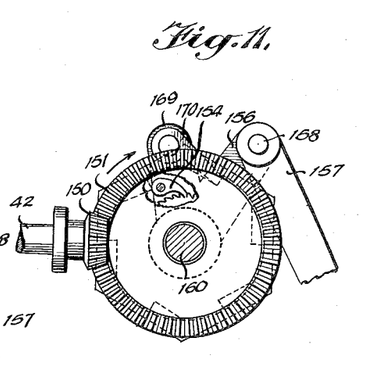
Fig. 11 is a detail sectional view taken on the line 11—11 of Fig. 10.
Figure 12:
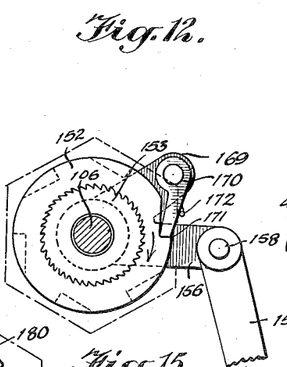
Fig. 12 is a detail sectional view showing the intermittent feeding mechanism in one of its positions.
Figure 13:
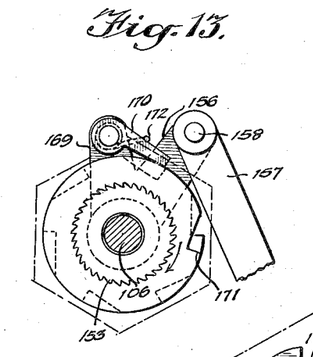
Fig. 13 is a similar view showing the feeding mechanism in another of its positions.

Referring to Fig. 8 it will be noted that this positioning mechanism comprises a frame or carrier member 33 of octagonal form. Secured to the faces of the octagonal member 33 are receivers 34. Each of these receivers 34 has side flanges 35, and projecting inwardly of each receiver 34 and rigidly carried by the members 35, are projecting members 36. The receivers 34 just described are immovable with respect to the octagonal member 33, that is, they are rigidly mounted thereon in any desired manner.

Interposed with respect to the receivers 34, are revolving or rotary receivers 37. Each of the receivers 37 has side flanges 38 with inwardly disposed portions 39 forming rigid extensions of the side flanges 38. Projecting inwardly from each of these rotary receivers 37, is a shaft 40, and such shafts 40 are mounted for rotation in the octagonal member 33, the inner end of each of the shafts carrying a gear 41, preferably of the bevel type.

Figure 2:
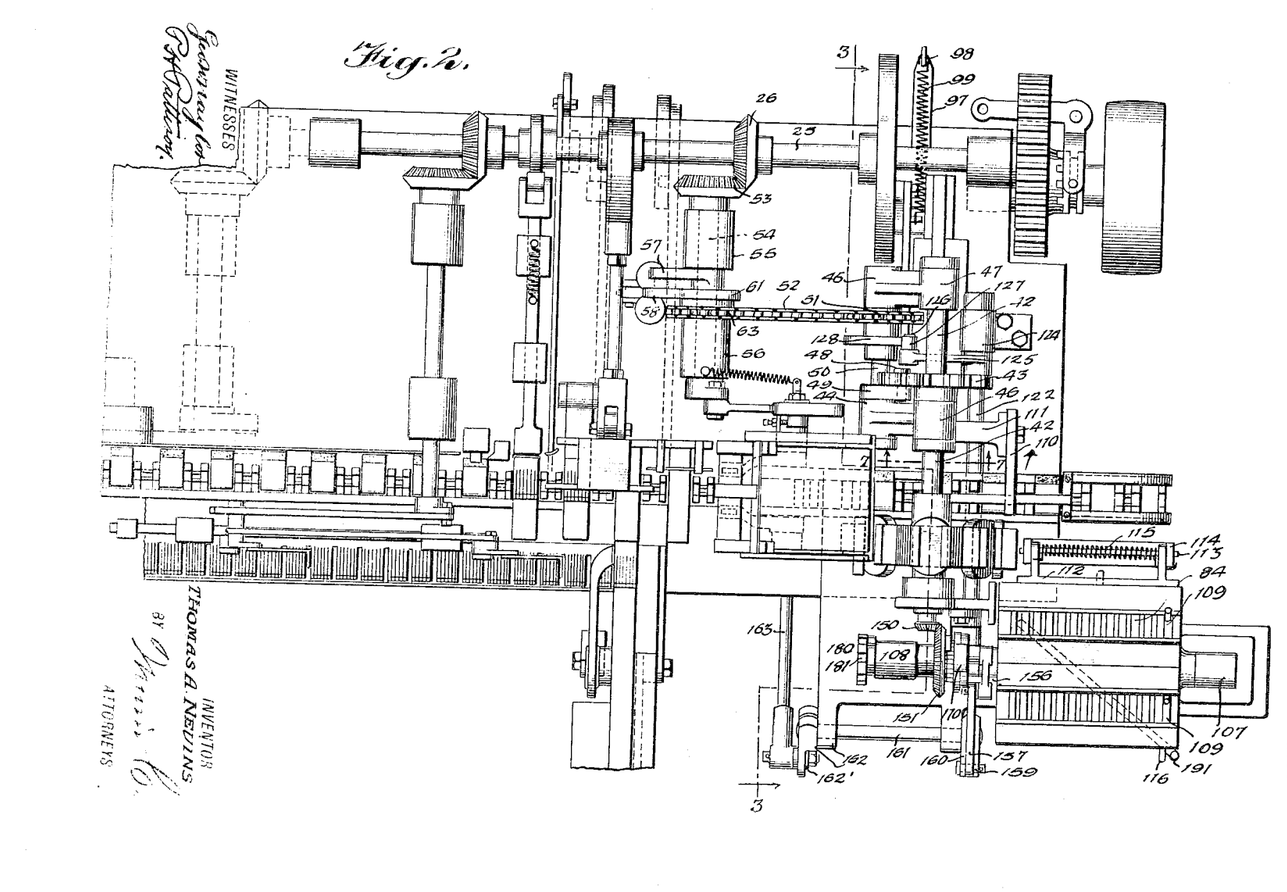
Fig. 2 is a plan view of the mechanism as shown in Fig. 1.
Figures 3, 4:
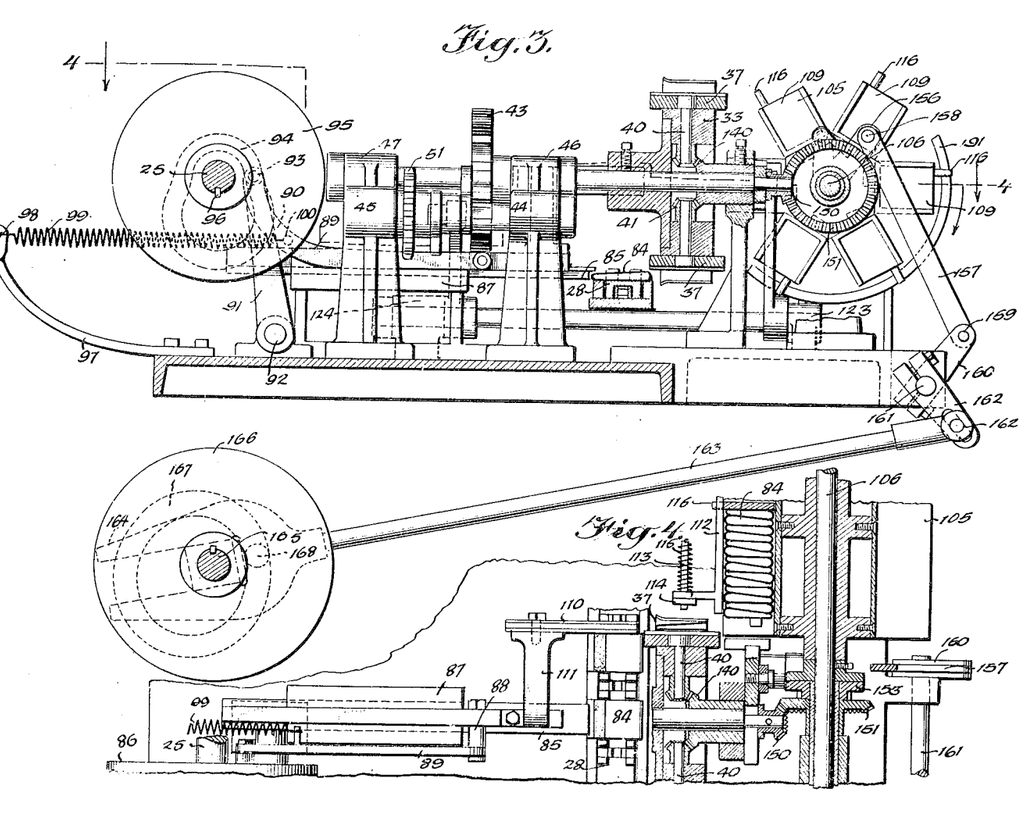
Fig. 3 is a detail sectional view taken on the line 3—3 of Fig. 2.
Fig. 4 is a horizontal sectional view taken on the line 4—4 of Fig. 3.

While it has heretofore been stated that the conveyer passes beneath the positioning mechanism, it will be noted also, by reference to Figs. 2 and 4, that the conveyer is to the rear of this positioning mechanism. As the conveyer brings the match books to the position adjacent the positioning mechanism, the match books are discharged from the conveyer and pass one into each of the receivers 34 and 37 heretofore mentioned, it being understood that the octagonal member 33 is rotated in a step-by-step movement, the intermittent motion taking place after a match book has been positioned in the receivers; that is to say, an empty receiver is positioned adjacent the conveyer, and a match book is discharged from the conveyer and positioned in the receiver, after which the octagonal member is given a movement sufficient to position the next receiver where it will receive another match book from the conveyer upon a subsequent operation of the parts.

Figures 5, 6, 7:
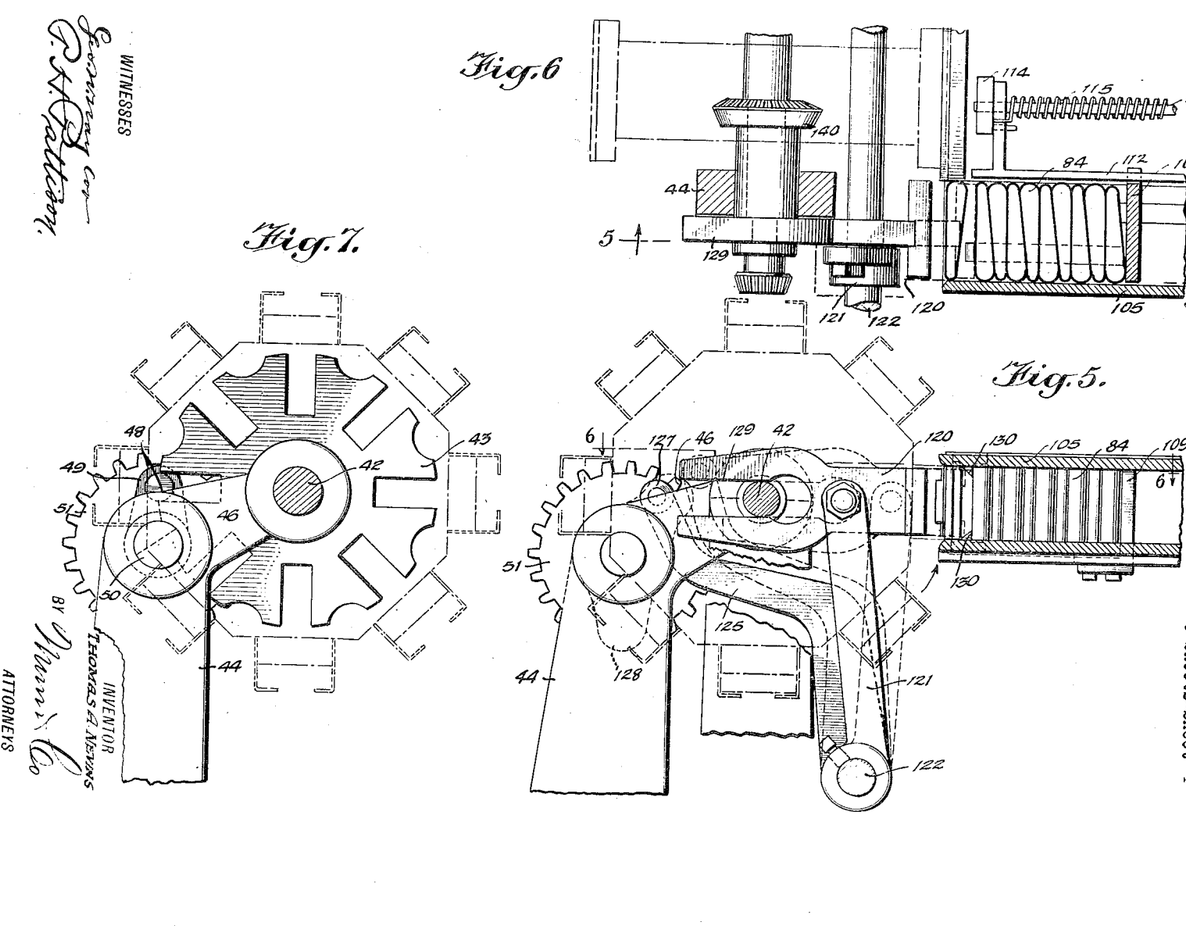
Fig. 5 is a sectional view taken on the line 5—5 of Fig. 6.
Fig. 6 is a sectional view taken on the line 6—6 of Fig. 5.
Fig. 7 is a detail sectional view taken on the line 7—7 of Fig. 2.

The positioning mechanism of which the octagonal member 33 is the main part, is mounted upon a shaft 42 extending transversely of the machine bed, that is, from front to rear thereof. This shaft has secured thereto the star gear 43 of a Geneva or gear-and-pin movement, and is mounted preferably in two standards 44 and 45, having offset upper arms or bracket portions 46 and 47, respectively, in which the shaft 42 is mounted, and between which the star wheel 43 is positioned upon said shaft. The pin of the Geneva movement is designated by the reference character 48, and such pin is carried by a crank 49, which in turn is mounted on a shaft 50. This shaft 50 is mounted in the standards 44 and 45 heretofore mentioned, as more clearly shown in Figs. 2 and 7. Mounted on this shaft 50 and serving the means by which the same is driven, is a sprocket 51, and passing around the sprocket 51 is a chain 52.

As heretofore mentioned the mechanism is driven by means of the gear 26 carried by the main power shaft 25, and this gear 26 meshes with a gear 53. This gear 53 is carried by a shaft 54 mounted in standards 55 and 56.

Mounted upon the shaft 54 and freely rotatable thereon between the standards 55 and 56, is a crank 57, and pivotally mounted on such crank is a pawl 58. As more clearly shown in Fig. 9, this crank 57 has a hub extension 59, which surrounds the shaft 54 and is splined thereto by means of a key 60. The hub extension 59 of the crank 57 forms a bearing for a circular member 61 and secured to the circular member 61 by suitable bolts, rivets, or the like, 62, is a sprocket wheel 63, which sprocket wheel is adapted to aline with the sprocket wheel 51 heretofore mentioned as carried by the shaft 42. It is around these two sprockets 51 and 63 that the chain 52 heretofore mentioned passes. The pivoted pawl 58 is maintained in engagement with the periphery of the circular member 61 by means of a spring 62' more clearly shown in Fig. 8, one end of which is secured to the crank 57, as at 63', the opposite end of the spring being free and engaging the pawl 58. The pawl 58 has an extension 64 on one of its ends, the purpose of which will be hereinafter described, and the other end of said pawl is adapted to engage a shoulder 65 formed by notching the periphery of the circular member 61.

From the foregoing it is apparent that as the shaft 25 is driven, through the medium of the gears 26 and 53 the shaft 54 will be driven. As the shaft 54 is driven the crank 57 is rotated therewith by means of the key 60, and with the pawl 58 in engagement with the shoulder 65, the circular member 61 is rotated. The circular member 61 serves to drive the sprocket 63 through the medium of the members 62, and by means of the chain 52, the sprocket 51 is driven. The sprocket 51 in turn serves as the means for rotating the shaft 50 and such shaft 50 serves to rotate the crank 49 which carries the pin 48 of the Geneva movement heretofore mentioned, which pin serves to drive the star wheel 43 of such Geneva movement, and through the medium of this Geneva movement the shaft 42 is intermittently operated. As the shaft 42 is intermittently operated, the octagonal frame 33 is given a step-by-step motion in a rotary direction in order that the several receivers 34 and 37 may be properly positioned with respect to the stacking mechanism so that the match books carried by the receivers may be discharged therefrom. This discharging mechansm and stacking mechanism together with their operating and controlling means will be hereinafter described.

In order that the counting of the match books may be accurately carried out, a controlling mechanism controlling the drive or the intermittent motion of the carrier frame 33 of the positioning mechanism 32, is employed. It is obvious that if this carrier frame 33 has a continuous rotary or a continuous intermittent motion and for any reason a receiver fail to receive a match book, due to the continuous motion of the machine, the stack in the stacking mechanism would be one short, and the controlling mechanism heretofore mentioned is intended (when a receiver fails to receive a match book) to momentarily prevent movement of the carrier frame 33 of the positioning mechanism until a match book has been deposited in the empty receiver.

The controlling mechanism comprises a bracket 70, and pivotally mounted in said bracket, as at 71, is a lever 72. The bracket 70 is so mounted on the machine that the normal position of the lever 72 positions its end 73 in the path of travel of the extension 64 of the pawl 58, and this lever 72 is maintained in its normal position by means of a coil spring 74.

It is apparent from the foregoing that each time the crank 57 makes a revolution, the extension 64 of the pawl 58 engages the end 73 of the lever 72 and rocks the pawl out of engagement with the shoulder 65. As soon as this action takes place the pawl 58 is free to move about the periphery of the circular member 61 until it has made a complete revolution when it will again be moved to a position where it will not engage the shoulder 65 providing the lever 72 is maintained in its normal position. If, however, the lever 72 be moved from its normal position, the pawl 58 under the influence of its spring 62, will engage the shoulder 65. It is to be understood that immediately the pawl disengages the shoulder 65, rotating movement of the circular member 61 ceases, and, consequently, the chain 52, the sprocket 45, and the shaft 50 are not driven, and, therefore, the positioning mechanism 32 is not driven. To prevent this action taking place upon each revolution of the crank member, however, a suitable mechanism is provided. This mechanism comprises an electromagnet 75 from which conductor wires 76 and 77 lead, and mounted in one of these conductor wires and designated by the reference character 78, is a suitable source of power. The conductor wire 76 is connected to a terminal 79, and the conductor wire 77 is connected to the terminal 80. The terminal 79 is stationary, the terminal 80 being carried by a rocking arm or lever 81, which lever is pivotally mounted, as at 82, to a suitable part of the frame of the machine. The lever 81 is adapted to be rocked about its pivotal point 82 to complete the circuit between the terminals 79 and 80, as shown in dotted lines in Fig. 8. This lever 81 is provided with a vertical extension or arm 83, so positioned with respect to the positioning mechanism 32 that as the match book is inserted in the lowermost receiver of the positioning mechanism 32 (it being understood that said match book is forced from the conveyer 28 to the receiver of the positioning mechanism), the vertical extension 83 will be engaged by the match book.

In Fig. 8ª the above-described operation is illustrated, the reference numeral 84 in said figure designating the match book which is discharged from the conveyer 28 by a suitable pushing means 85, the operation of which will be hereinafter more fully described. As this pusher 85 moves the match book from the conveyer 28 into the receiver 34, the vertical extension 83 of the pivoted lever 81 is moved downwardly by the passage of the match book thereover. As this extension 83 is forced downwardly the lever 81 is rocked about its pivotal point and the terminal 80 is caused to engage with the terminal 79, as shown in dotted lines in Fig. 8. This engagement of the terminals 79 and 80 completes a circuit to the electromagnet 75, and said electromagnet attracts an armature 86 carried by the pivoted lever 72. This action moves the pivoted lever 72 to the dotted-line position shown in Fig. 8, where it is out of the path of travel of the extension 64 of the pawl 58, and thus the pawl 58 is not disengaged from the shoulder 65 and the circular member 61 continues to rotate.

Assuming now, however, that the particular pocket 29 of the conveyer 28, which is positioned beneath the receiver 34, fails to have a match book positioned therein. The pushing element 85 moves through the pocket as in the act of discharging a match book therefrom, but due to the absence of the match book the vertical extension 83 of the pivoted lever 81 is not engaged, and therefore is not depressed. If the vertical extension 83 is not depressed, the lever 81 is not rocked about its pivotal point, and therefore the electrical circuit is not completed, and, under the influence of the spring 74, the end 73 of the pivoted lever 72 is maintained in position in the path of travel of the extension 64 of the pawl 58 and the previously described operation of disengaging the pawl from the shoulder 65 is carried out. By this construction it is apparent that each time a pocket of the conveyer is positioned beneath a receiver of the positioning mechanism, which pocket contains no match book, the intermittent operation of the frame 33 of the positioning mechanism 32 is discontinued until another pocket containing a match book is positioned beneath the receiver 34.

As heretofore stated, the match books are moved from the conveyer 28 to the lowermost receiver of the positioning mechanism by a pusher arm 85. This pusher arm 85 is mounted in a suitable guide 87 supported on the bed of the machine, and pivotally connected, as at 88, to this pusher arm is a link 89 having an upwardly curved portion 90 more clearly shown in Fig. 3. The upwardly curved portion is pivotally connected to the rocking lever 91, which latter is pivotally mounted on the bed of the machine as at 92. A pin 93 pivotally connects the link 90 and the lever 91 together, and this pin travels in a cam groove 94 formed in a disk, or the like, 95, which is keyed to the shaft 25, as at 96. By this construction it is apparent that each revolution of the disk 95 causes a complete movement of the pusher 85 to transfer a match book from the receiver 28 to one of the receivers of the positioning mechanism 32.

Projecting from the rear of the bed of the machine is an arm 97. This arm is curved upwardly and connected at its end, as at 98, is a coil spring 99, the opposite end of which is connected, as at 100, to the link 89, and serves to maintain the pin 93 heretofore mentioned at all times in engagement with the wall of the cam groove 94, thus assuring proper operation of the pusher arm 85.

After the match boxes have been moved from the conveyer 28 to the lowermost receiver of the carrier, the carrier is rotated and the receivers of the carrier are moved from the bottom upwardly ninety degrees in an anti-clockwise direction. This places the several receivers of the carrier 33 in a position to have the match boxes discharged therefrom to a stacking mechanism.

The stacking mechanism comprises a plurality of trough-like members 105 carried by a shaft 106, which shaft is mounted in standards 107 and 108. Mounted in each of the troughs is a follower member 109 forming a movable end wall for its respective trough-like member.

In order to discharge the match boxes from the receivers of the carrier 33, a pusher element 110 is provided, which pusher element is carried by an arm 111 which projects upwardly from the pusher arm 85 heretofore mentioned. This construction is more clearly shown in Fig. 4. By this construction it is apparent that each time the pusher element moves forwardly to project a match book from the conveyer 28 into the lowermost receiver of the carrier frame 33, the pusher arm 110 will be moved to discharge a match book from the receiver of the carrier frame 33, which is in position to discharge its match book in the proper trough-like member of the stacking mechanism.

One side of these trough-like members of the stacking mechanism is open, and to close the same and prevent accidental discharge of match books therefrom, a guard member 112 is employed, which guard member is carried by a shaft 113 mounted in brackets 114 projecting vertically from the bed of the machine. Surrounding the shaft 113 is a spring 115 adapted to maintain the guard member 112 in horizontal position. Each of the members 109 is provided with a projection 116, which engages beneath the guard member 112 and serves as the stacking mechanism rotates, to rock the guard member 112 about the shaft 113 to permit of rotation of the stacking mechanism.

As the match books are deposited in the trough-like members, it is necessary to move them longitudinally thereof to provide room for subsequent match books being introduced thereinto. To provide for this operation, a pushing member 120 is pivotally carried by the lever 121, which lever is mounted upon a shaft 122, and which shaft in turn is mounted in bearings 123 at the front of the machine and bearings 124 near the rear of the machine. This shaft has secured thereto an arm 125 carrying a stub shaft 126 on which is mounted a roller 127. This roller 127 engages a cam 128 carried by the shaft 50. By this construction it is apparent that as the shaft 50 is rotated, the cam 128, through the medium of the lever 121, causes an oscillation of the shaft 122. The rear end of the pushing member 120 is bifurcated as at 129, and this bifurcated end embraces the shaft 42 heretofore mentioned, which shaft serves as a guide for the member 120. As the pushing member 120 moves into the trough-like member 105 of the stacking mechanism, which is receiving the match books, the same serves to push the match books behind spring-pressed fingers 130, and such fingers serve to maintain the match books 84 within the trough-like member where another match book may be positioned therein in advance of the spring-pressed fingers 130.

As the match books are thicker at one end than at the other, it is necessary that alternate match books be reversed in the stacking mechanism in order that a straight stack having equal length sides may be formed. In order to carry out this arrangement of match books in the stacking mechanism, the gears 41 carried by the shafts 40 heretofore described mesh with a bevel gear 140, such bevel gear being stationary and serving to rotate the shafts 40 as the carrier 33 of the positioning mechanism is rotated. This construction is more clearly shown in Figs. 3 and 4.

As each receiver 37 is provided with a shaft 40, it is obvious that as the carrier 33 of the positioning mechanism is rotated, the receivers 37 will be rotated about the axis of their shaft 40 in the movement of ninety degrees of the carrier 33, and that each of said members in moving through ninety degrees movement of the carrier 33, will be given a half revolution. By this construction it is apparent then that inasmuch as each of the receivers receives its match book with the thick end positioned at the front of the machine, by the time the revolving receivers move through the ninety-degree movement of the carrier 33, they will have their respective match books positioned with the thin end thereof forward of the machine, in which position the match books are disposed in the trough-like members 105 of the stacking mechanism, while the stationary receivers will discharge their match books into the trough-like members of the stacking mechanism with their thicker end toward the front of the machine, and thus the match books will be presented to the stacking mechanism in alternate relation.

It is the common practice to pack matches of this type in boxes of fifty, and in each box of fifty there are two columns of twenty-five each. It will therefore be noted that each of the trough-like members is adapted to contain twenty-five match books, and in order to move the empty trough-like member into match-book-receiving position, after twenty-five match books have been deposited therein, the following mechanism is employed:

Referring to Figs. 10 to 15, inclusive, it will be noted that the shaft 42 is provided with a bevel gear 150 and such bevel gear drives a larger bevel gear 151. The bevel gear 151 is freely rotatable upon the shaft 106 heretofore mentioned. Keyed to the shaft 106 is a circular member 152, and carried by said circular member 152 is a ratchet wheel 153. Carried by the gear 151 is a pawl 154, said pawl being secured to the gear 151 by a screw, or the like, 155. By this construction it is apparent that each time the shaft 42 moves, through the medium of the gear 150 the gear 151 will be driven. Further, it will be noted that through the medium of the pawl 154, the ratchet wheel 153 will be driven from the gear 151. It is to be understood that this movement is an intermittent movement since it is controlled by the shaft 42, which in turn is controlled by the mechanism illustrated in Fig. 8.

Loosely mounted upon the shaft 106 is an arm 156, and said arm is given an oscillating movement by means of a lever 157 pivotally connected thereto as at 158. As more clearly shown in Fig. 3, this lever 157 is pivotally connected at its lower end, as at 159, to a crank 160, and such crank is rigidly mounted upon a shaft 161. The shaft 161 carries another crank 162, and having pivotal and sliding connection, as at 162′, with said crank 162, is a lever 163. The other end of this lever 163 is forked as indicated by the reference character 164, and surrounds a shaft 165 which extends longitudinally of the machine, as more clearly shown in Fig. 1. Mounted upon this shaft 165, is a disk 166, and said disk has a cam groove 167 in which a pin 168 travels, said pin being carried by the forked end 164 of the lever 163. By this construction it is apparent that upon each revolution of the member 166, the lever 163 will be reciprocated and cause the shaft 161 to oscillate. By means of the crank 160 and lever 157, the crank 156 will be oscillated upon the shaft 106.

By referring again to Figs. 10 to 15, inclusive, it will be noted that the arm 156 has a second arm 169 rigidly connected therewith, and said arm 169 has pivotally secured thereto a pawl 170. This pawl 170 is adapted to ride the periphery of the circular member 152. This circular member 152 is provided with a notch forming a shoulder 171 with which the pawl 170 is adapted to engage, and a spring 172 is employed to move said pawl into engagement with the shoulder 171 as the notch of the circular member 152 passes beneath the pawl.

Secured to the shaft 106 by means of a set screw or the like, 173, is a notched circular member 174, and said circular member is adapted to rotate the shaft when it is engaged by the pawl 170 heretofore mentioned. The notched member 174 is provided with a plurality of notches 175, with which the pawl 170 is adapted to engage in the following manner: The notched circular member 152 is mounted adjacent the notched member 174, as clearly shown in Fig. 15. As an oscillating movement is given to the arm 160, which carries the pawl 170, the pawl rides the periphery of the notched circular member 152. This notched circular member 152 is driven by the pawl 154 heretofore mentioned and each time the notch thereof registers with one of the notches 175 of the notched member 174, the pawl 170 drops into engagement with the notch 175 with which the notch in the member 152 is in register and moves the same as the pawl 170 is moved by the lever 157 and the arms 156 and 169 in the manner heretofore described. Inasmuch as the member 151 is driven by the shaft 42 and the shaft 42 is in turn driven by the chain 52, it will be seen that the stacking mechanism will not be moved until the required number of match books have been positioned in each respective trough-like member since the mechanism shown in Fig. 8 terminates a movement of the shaft 42, unless a match book is discharged from the conveyer 28 to the lowermost receiver of the carrier 33 of the positioning mechanism.

To lock the shaft 106 against movement while the circular member 152 is moving beneath the pawl 170, said shaft is provided on its end adjacent the center of the machine with a notched disk 180, said disk having a plurality of notches 181 in its periphery. This disk 180 is splined to the shaft 106 by means of a key 182. Adapted to engage with the notches of this member 180, is a locking plunger 183, the lower end of which is forked as at 184, and said forked end straddles a guide member 185. Carried by this forked end 184 of the member 183, is an arm 186, and connected thereto at one end is a coil spring 187, the opposite end being connected to a stationary arm 188.

Figure 14:
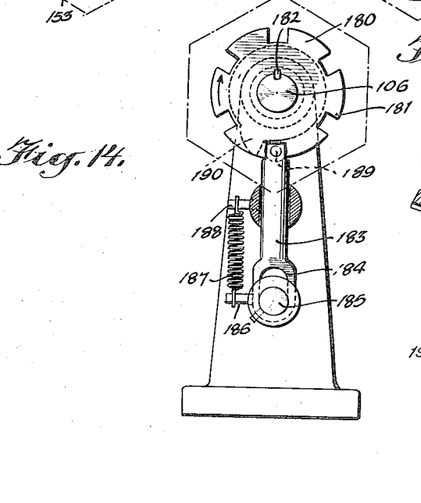
Fig. 14 is a detail view showing the means for locking the stacking mechanism against movement.

By this construction as the locking member 183 is moved downwardly the spring 187 is placed under tension and such tension serves to return the locking member 183 to normal position in which it is shown in Fig. 14. To provide for moving the locking member 183 out of engagement with the notches 181 of the notched member 180, the upper end of said member is provided with a roller 189, and said roller is adapted to be engaged by a cam 190 which is positioned with respect to the notch in the circular member 152, so that simultaneously with the dropping of the pivoted pawl 170 into the notch of the member 152, the cam will engage the roller 189 carried by the locking member 183 and move the same down out of engagement with the notch 181 of the notched member 180 with which it is engaged and thus permit of a movement of the shaft 106. By this construction it is apparent that the shaft 106 is held against movement while the periphery of the member 152 is moving beneath the pawl 170.

What is claimed is:

1. In a mechanism for counting and stacking finished match books, a stacking mechanism, a conveyer for delivering the finished match books to the stacking mechanism, and means adapted to be engaged by a match book in said conveyer for rendering said delivering mechanism operative and for rendering the said delivering mechanism inoperative upon its failure to receive a match book.

2. In combination with a match-book-making machine having means for singly delivering the finished match books therefrom, a stacking mechanism, means for receiving said singly delivered match books and transferring them to the stacking mechanism, and means for rendering said receiving means inoperative upon its failure to receive a match book from the match-book-making machine, said means including an electric switch operated by a match book in said receiving means.

3. A match-book stacking mechanism comprising a plurality of trough-like members, means for singly positioning said trough-like members relatively to a mechanism for delivering match books thereto, means for positioning match books in said trough-like members, and means for moving said match books longitudinally of the trough-like members after they have been positioned therein.

4. In combination with a match-book-making machine, a stacking mechanism, and means for transferring said match books from the match-book-making machine to the stacking mechanism, said means comprising a polygonal shaped rotating frame member, a plurality of stationary receivers carried on the periphery of said rotating frame and in alternate faces thereof, and a plurality of rotating receivers carried by the periphery of said frame in alternate faces thereof.

5. In combination with a match-book-making machine, a stacking mechanism, and means for transferring said match books from the match-book-making machine to the stacking mechanism, said means comprising a rotating polygonal shaped frame member, a plurality of stationary receivers carried by the periphery of said rotating frame and in alternate faces thereof, and a plurality of rotating receivers carried by the periphery of said frame, said rotating receivers being mounted in alternate faces of the frame and interposed with respect to the stationary receivers whereby alternate match books are reversed in position.

6. In combination with a match-book-making machine having a conveyer for discharging the finished match books from the machine, a stacking mechanism including a plurality of troughs, and means for receiving the match books from the conveyer and delivering them to the troughs of the stacking mechanism, said means comprising a rotary frame member, a plurality of stationary receivers carried thereby, a plurality of rotating receivers carried thereby, means for imparting step-by-step rotary motion to said rotating frame, and means for simultaneously rotating the rotating receivers.

7. In combination with a conveyer for carrying finished match books, a stacking mechanism including a plurality of troughs, and means interposed between the conveyer and the stacking mechanism for transferring the finished match books from the conveyer to the troughs of the stacking mechanism, said means comprising a rotary frame-like member having receivers adapted to pass in proximity to the conveyer, means for discharging the match books from the conveyer to said receivers, said receivers also being adapted to move in proximity to the troughs of the stacking mechanism, and means for discharging the match books from the receivers to the troughs of the stacking mechanism, both said discharging means being operated at the same time.

THOMAS A. NEVINS.